INVENTORS
PLUMMER E. DOUBLE
HERMAN R. ABBRECHT

BY ATTORNEYS

INVENTORS
PLUMMER E. DOUBLE
HERMAN R. ABBRECHT

BY

ATTORNEYS

April 22, 1969     P. E. DOUBLE ET AL     3,439,723

NUT-PANEL ASSEMBLY

Original Filed March 14, 1962     Sheet 4 of 4

INVENTORS
PLUMMER E. DOUBLE
HERMAN R. ABBRECHT

BY

ATTORNEYS 3,439,723
NUT-PANEL ASSEMBLY
Plummer E. Double, Detroit, and Herman R. Abbrecht, Birmingham, Mich.; said Double assignor to Multifastener Corporation, Redford, Mich.
Original application Mar. 14, 1962, Ser. No. 179,621, now Patent No. 3,315,345, dated Apr. 25, 1967. Divided and this application Oct. 20, 1966, Ser. No. 618,551
Int. Cl. F16b 39/00
U.S. Cl. 151—41.73               4 Claims

ABSTRACT OF THE DISCLOSURE

A nut-panel assembly in which a pilot portion of the nut extends through an opening in the panel. The nut has shoulders adjacent the pilot portion with re-entrant grooves between the shoulders and the pilot portion. The re-entrant grooves receive severed portions of the panel which are joined to the main portion of the panel by arcuate sections.

---

The present invention relates to a nut-panel assembly and is a divisional application of our copending application Ser. No. 179,621 filed Mar. 14, 1962, now Patent No. 3,315,345. More specifically the instant application relates to a nut-panel assembly in which a multi-thread nut is secured to a sheet metal panel by shearing and displacing into a re-entrant nut groove a portion of the panel after the panel has been pierced by a pilot portion of the nut.

The utilization of pierce nuts for adhering a multi-thread nut to a sheet metal panel is well known, for example a pierce nut-panel assembly and a specific method of assembly is shown in Patent No. 2,707,322.

The sheet metal panel is first pierced by the nut and then the panel is swaged or otherwise deformed into undercut grooves in the side surface of the nut pilot portion. Thus, the undercut groove, which is filled with panel metal, serves to restrain the nut and the panel against separation.

In the majority of cases in which the panel-nut assembly is to be utilized to secure the panel of the assembly to an additional panel by means of a bolt threaded into the nut, it is desirable that the panel and the end face of the nut be flush. To obtain this flush relation, it is necessary to emboss the panel before or during the assembly, as disclosed in FIGURE 5 of the above-identified patent.

The present invention provides a new and improved nut-panel assembly of increased resistance to relative separation prior to installation of the assembly in its final bolted environment. Further, after assembly in the final bolted environment, the nut-panel assembly is capable of resisting a greater torque load applied to the retaining bolt.

This increased resistance of the assembly to separation prior to installation and the increased strength of the assembly in its final environment are both due to the fact that substantially all deformation of the panel to secure the panel and the nut together occurs within the confines of the nut. In other words, the nut-panel assembly is provided with a substantially completely enclosed embossure. Thus, the nut substantially confines the deformed panel portions in the nut-panel assembly prior to its installation in the final environment and, in the final environment itself, the panel is interposed between and substantially fully supported by the nut and the adjacent panel or other member secured to the assembly.

It is, therefore, an important object of the present invention to provide an improved nut-panel assembly of increased retention capability and of increased torque capacity.

It is a further important object of this invention to provide a nut-panel assembly wherein a portion of a panel is severed therefrom and entrapped within a nut groove, the severed portion of the panel being joined to the remainder of the panel lying exterior to the groove by arcuate joining portions.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
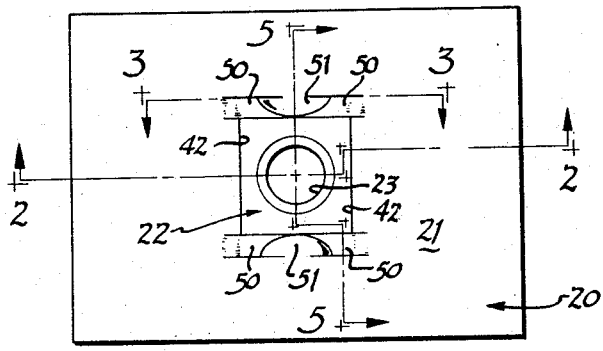
FIGURE 1 is a plan view of one embodiment of a nut-panel assembly of the present invention.

As shown on the drawings:

In FIGURE 1, reference numeral 20 refers generally to a nut and panel assembly of the present invention and including a sheet metal panel or the like 21 having assembled thereto a pierce nut indicated generally at 22.

Figure 2:
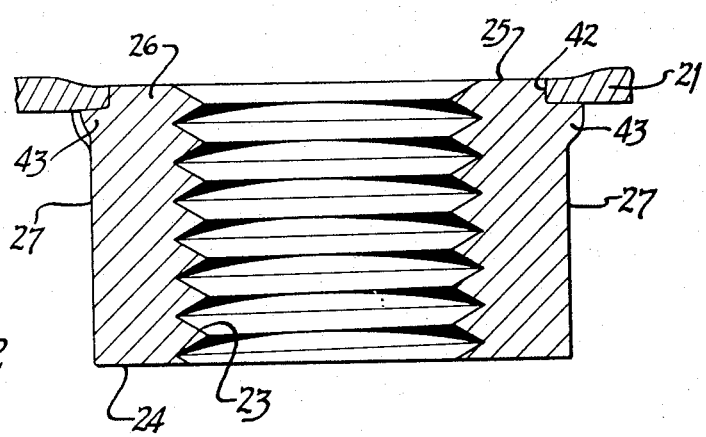
FIGURE 2 is a sectional view taken along the plane 2—2 of FIGURE 1.
Figure 4:
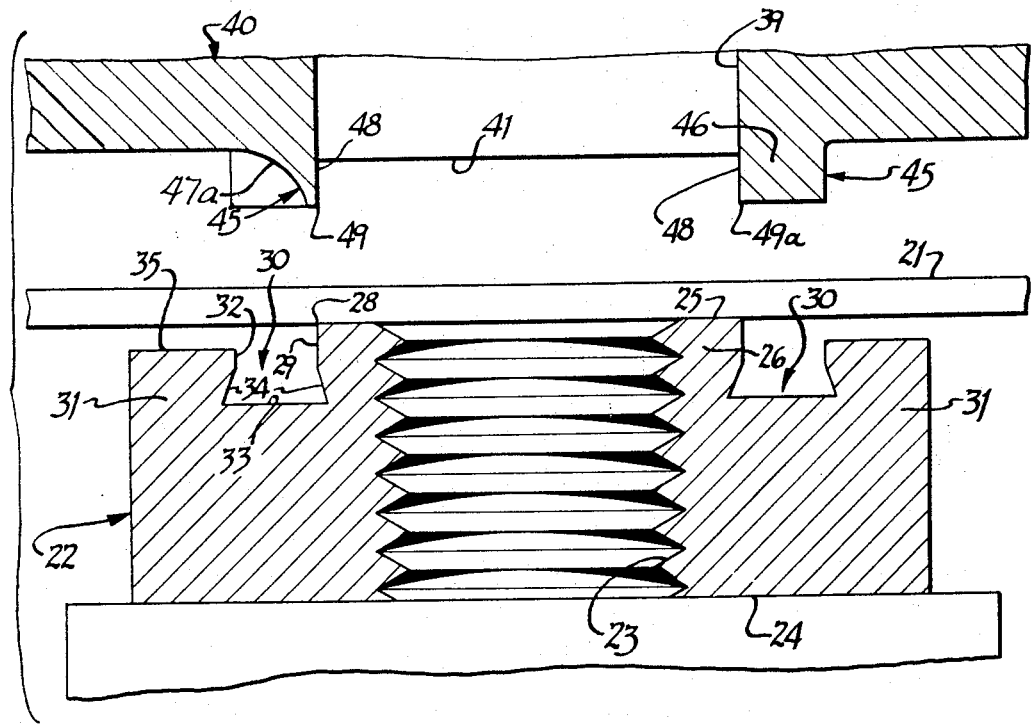
FIGURE 4 is an enlarged sectional view of a nut, panel and die button taken along plane 5—5 of FIGURE 1 prior to assembly of the nut and the panel.

As best illustrated in FIGURES 1, 2 and 4, the nut 22 is provided with a central threaded aperture 23 opening onto opposing end faces 24 and 25 of the nut. The end face 25 of the nut is defined by a centrally located nut pilot portion 26. This nut pilot portion 26 is provided at spaced, parallel, opposing sides of the nut with vertically extending side walls 27 blending into the end face 25 of the nut through right angular piercing corners. The other lateral extremities of the piercing portion 26 of the nut are provided with right angular piercing corners 28 formed at the juncture of the end face 25 and vertical pilot portion side walls 29 which overlie re-entrant grooves 30 defined between the nut pilot portion 26 and laterally projecting nut flanges 31.

The re-entrant grooves 30 have re-entrant openings or restricted entrance mouths defined between the nut pilot portion side walls 29 and inner flange surfaces 32, the groove proper being defined by a bottom wall 33 intermediate upwardly and inwardly tapering groove side walls 34 inset beneath the walls 29 and 32, respectively. Since the nut is formed by shearing to length a rolled section, any desired re-entrant groove shape which can be rolled may be used.

The nut flanges 31 are provided with upper exposed surfaces 35 which are displaced vertically from, but parallel to the nut end face 25, these surfaces 35 defining stop surfaces upon which the sheet metal panel 40 is bottomed during nut-panel assembly, as hereafter explained.

The method of assembly of the nut 22 and the panel 21 will be readily appreciated from a comparison of FIGURES 2, 3, 4 and 5 of the drawings. As illustrated, the nut 22 is supported upon a fixed supporting surface 19 with the panel 21 superimposed thereon while a die button 40 is displaced vertically relative to the nut and the panel. Of course, it will be readily understood by those skilled in the art that the die button may be fixed and the nut 22 displaced relative to the fixed die button, as by a press punch or the like. Additionally, the panel may well contact the die button 40 rather than the nut 22 prior to assembly. In any event, the nut is moved relative to the die button with the panel interposed therebetween, so that the nut and the die button cooperate to sequentially pierce the panel pilot portion 22 through the panel 21 and then to swage, emboss, or otherwise deform the panel by virtue of its confinement between the nut and the die button.

More specifically, the die button 40 has a central aperture 39 and is provided with opposing shearing edges 41 which are spaced apart through a distance less than the width of the nut, i.e. less than the distance between the nut side surfaces 27 (FIGURE 2). Thus, upon relative nut-die button displacement, the edges 41 punch through the sheet metal panel 21, as at 42, and continued relative nut-die button movement displaces the panel 21 downwardly relative to the nut, as illustrated in FIGURE 2, displacing the relatively softer nut metal beneath the panel, as at 43. This laterally bulged or displaced nut metal 43 increases nut-panel contact and, in the final threaded assembly, increases the resistance of the nut-panel assembly to "pull through" due to nut torque tending to displace the nut upwardly through the panel aperture.

Figure 3:
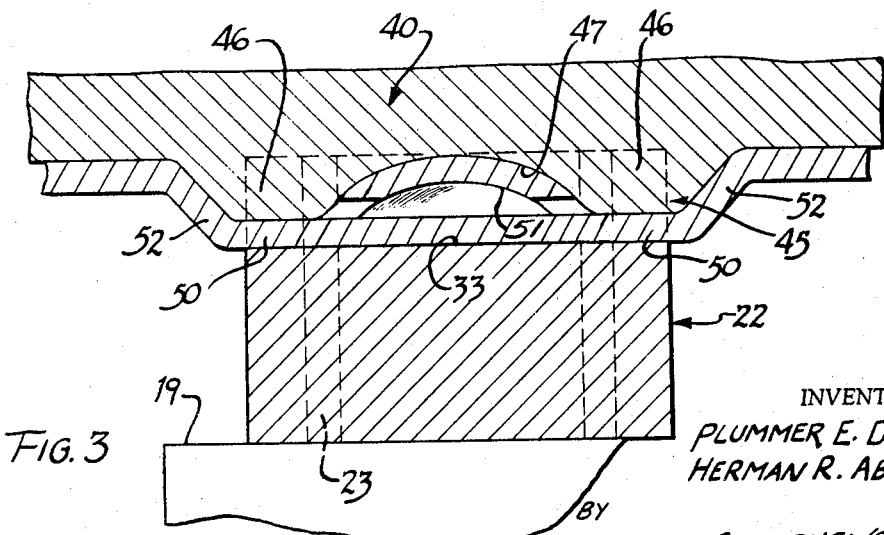
FIGURE 3 is a sectional view taken along the plane 3—3 of FIGURE 1.
Figure 5:
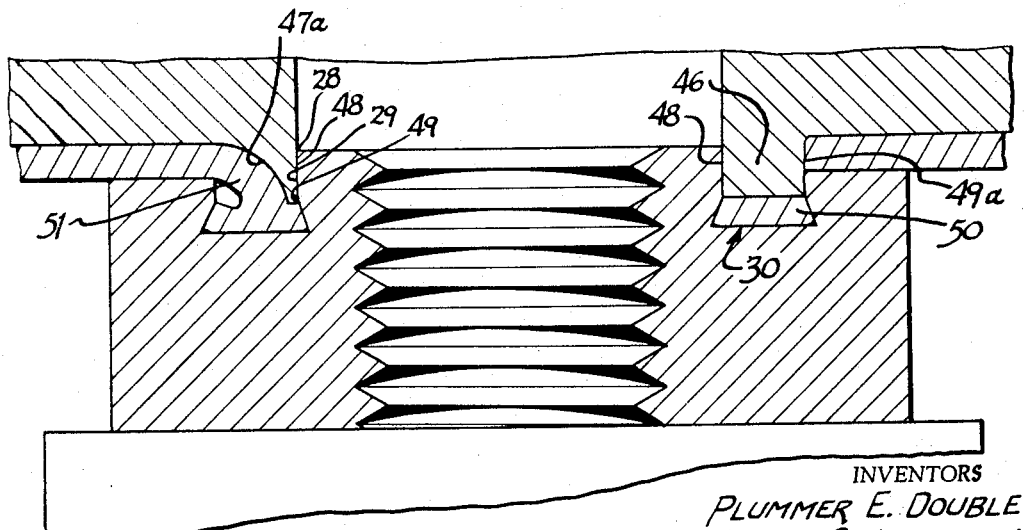
FIGURE 5 is an enlarged sectional view taken along the plane 5—5 of FIGURE 1 and illustrating the die button in position following forming of the nut-panel assembly.

The other opposing, parallel sides of the die button 40 are provided with elongated embossments indicated generally at 45. These embossments 45, as best illustrated in FIGURES 3, 4 and 5 include a pair of longitudinally spaced piercing projections 46 which are generally rectangular in cross-section (FIGURE 4) and which are joined together along an arcuate raised surface 47 defining a central recess. It will be seen from FIGURE 5, that the projections 46 are provided with parallel inner side surfaces 48 which are vertically aligned with the corresponding nut pilot portion side surface 29 and which are of such length as to extend therebeyond. Located at the lower corner 49 of the surfaces 48 is a sharpened shearing edge which cooperates with the upper piercing corner 28 of the nut pilot portion to punch from the panel a piece of metal corresponding in shape and size to the aperture 39 of the die button 40. Thus, the corners 49 shear the sheet metal throughout the entire longitudinal extent of the nut pilot portion 26 and cooperate with the nut pilot portion to pierce the nut through the sheet metal panel 21.

The outer edge of the die button embossment 46 is differently contoured, this surface at the projections 46 lying parallel to the die button surfaces 48, as at 49a. Intermediate the projections 46, these outer surfaces are arcuate, as at 47 heretofore explained, this arcuate surface 47 being radiused longitudinally in an elliptical pattern as illustrated in FIGURE 3 and being radiused transversely to a segmental spheroidal configuration, as illustrated at 47a in FIGURE 5.

As a result of the arcuate die button surfaces 47 and 47a, the projections 46, which fit snugly within the re-entrant groove mouth defined between the surfaces 29 and 32, completely sever localized portions of the panel 21 and deflect these portions downwardly into the wider groove portion defined between the side walls 34 and the bottom 33 thereof while the panel metal underlying the arcuate surfaces 47 is not severed completely from the remainder of the panel and serves to join the severed portions, indicated generally at 50 with the remainder of the panel, the joining portions being indicated generally by reference numeral 51. It will be noted, from both FIGURES 3 and 5 that the apex of the curved die button portion defined by the surfaces 47 and 47a lies substantially at the level of the upper surface of the panel 21 prior to deformation, so that the completely severed and displaced panel portions 50 entrapped within the grooves 30 are joined to non-deformed portions of the plate by the full thickness, arcuate joining portions 51. At the outer extremities the projections 46 are inclined upwardly and outwardly to join the non-deformed portions of the panel 20 outwardly of the nut grooves 30.

Thus, there is provided a nut panel assembly wherein portions 50 of the panel of less extent than the nut grooves 30 are displaced into the nut grooves and deformed therein to completely fill the lower re-entrant portions of the groove, and the severed filling portions 50 are joined to the remainder of the plate by joining portions 51 projecting through the restricted entrance mouths of the grooves for juncture with non-deformed portions of the plate. By utilizing the two spaced and severed plate portions 50 joined by the arcuate medial portions 51, the nut is secured to the plate at a plurality of spaced locations to yield a structure in which the nut is firmly affixed to the panel. The resistance of the nut to turning movement relative to the panel 21 is enhanced by the firm contact between the panel edges 42 and the non-grooved portions of the nut side walls 27 (as shown in FIGURE 2) and the outer angularly deflected extremities 52 of the panel 21 (as illustrated in FIGURE 3) also provide substantial torque resistance.

In the modified form of the invention illustrated in FIGURES 6 through 11, the prime difference resides in the fact that only a single portion of the panel is deflected into the re-entrant nut groove following piercing, as distinguished from the dual displacement of the panel as described in conjunction with the first embodiment heretofore defined.

Figure 6:
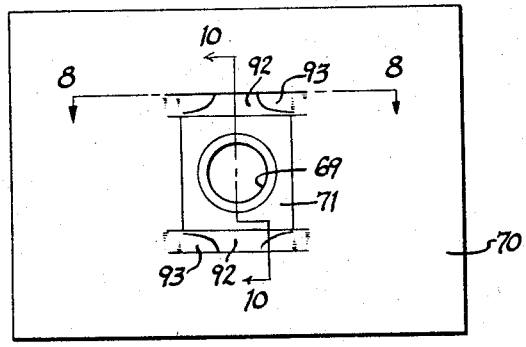
FIGURE 6 is a plan view similar to FIGURE 1, but illustrating a different embodiment of the present invention.
Figure 7:
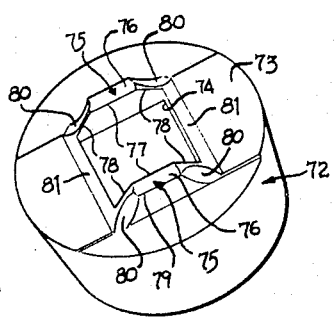
FIGURE 7 is an elevational perspective view of a die button utilized to form the assembly of FIGURE 6.

More specifically, the assembly of the panel or plate 70 and the nut 71 of FIGURE 6 is accomplished by means of the die button of FIGURE 7. This die button is formed from a generally cylindrical block 72 and is provided with a substantially planar surface 73 which becomes the lower surface of the die button when it is oriented in FIGURES 6 through 10. This die button face 73 circumscribes a rectangular aperture 74 for receiving the punched-out portion of the panel. Projecting beyond the die button face 73 are opposed, parallel die button projections indicated generally at 75 and each comprising a generally planar piercing and staking face 76. The inner marginal piercing edges 77 of the faces 76 are joined to the surface 73 by inclined, linear piercing edges 78. The outer edges 79 of the piercing and staking faces 76 are joined to the surface 73 by concave, curved joining surfaces 80 which relieve the outer corners of the projections 75 for a purpose to be hereinafter more fully explained.

Those parallel sides of the rectangular aperture 74 not provided with projections 75 are also provided with lower piercing surfaces 81 similar to the surfaces 41 of the embodiment of FIGURES 1 through 5.

Figure 8:
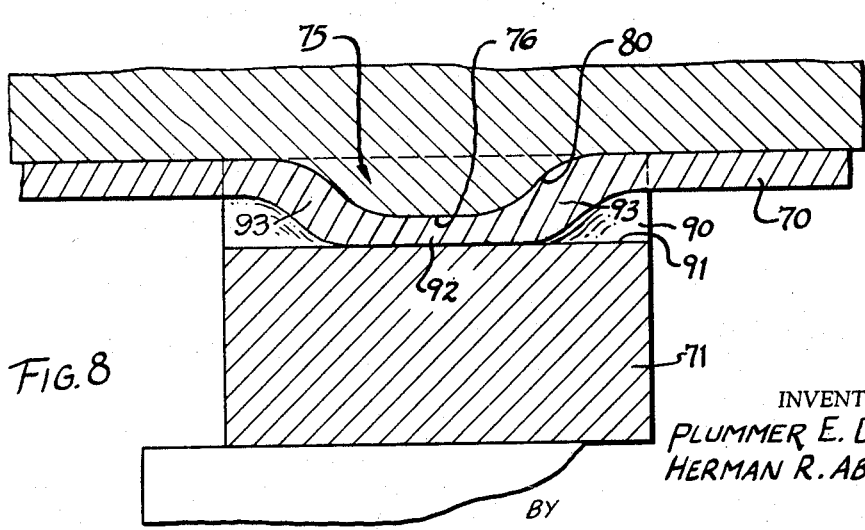
FIGURE 8 is an enlarged sectional view taken along the plane 8—8 of FIGURE 6.
Figure 9:
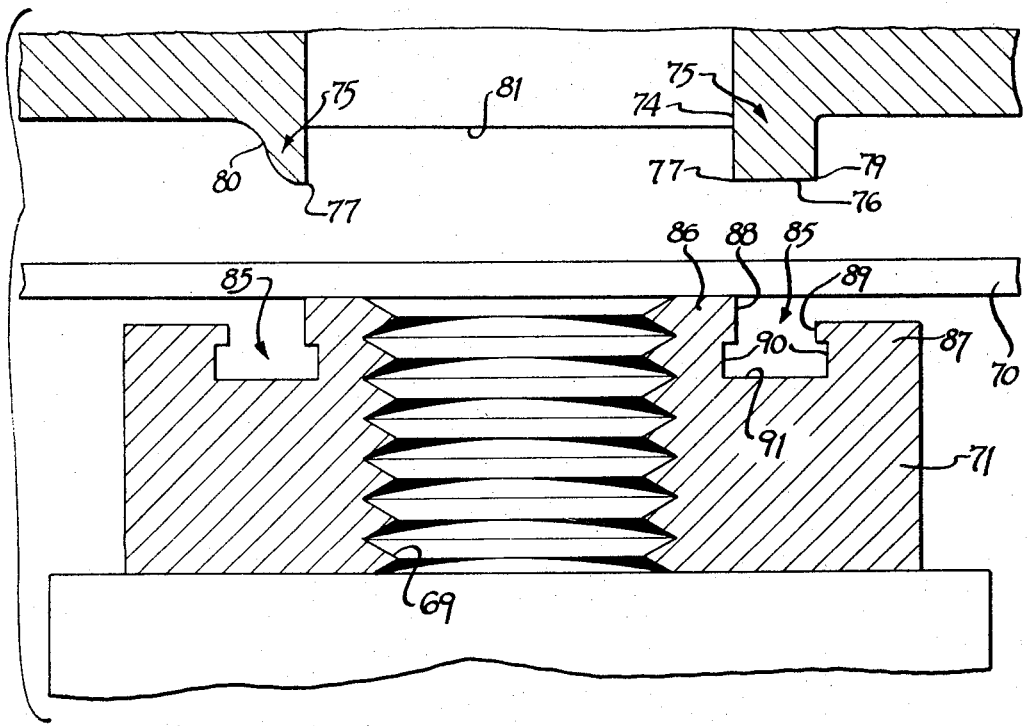
FIGURE 9 is a view similar to FIGURE 4 heretofore described, but illustrating the modified form of the present invention as viewed along plane 10—10 of FIGURE 6.
Figure 10:
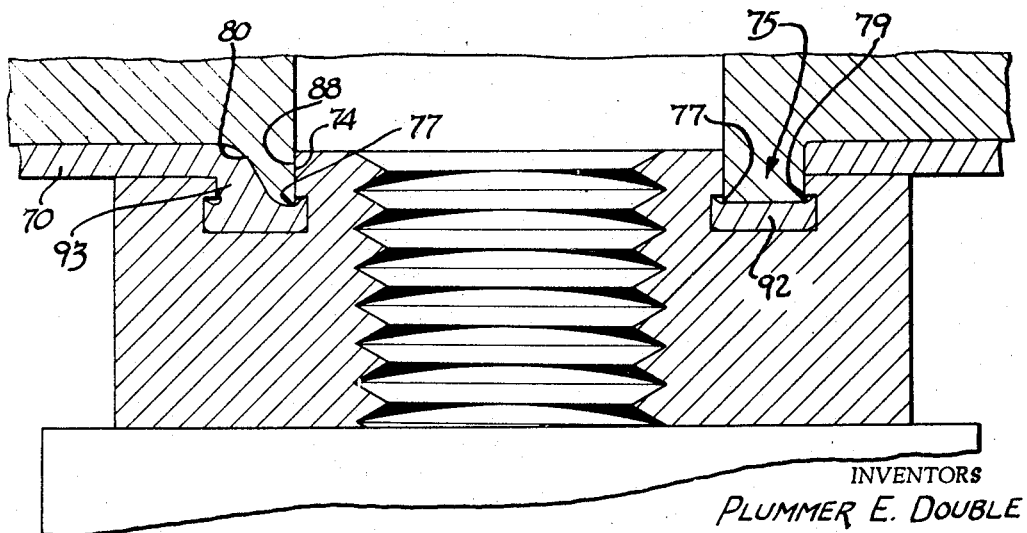
FIGURE 10 is a view taken along the planes 10—10 of FIGURE 6 and illustrating the die button of FIGURE 7 in its actuated position after assembly.

As best illustrated in FIGURES 8, 9 and 10, the nut 70 is provided with spaced, parallel, open-ended re-entrant grooves indicated generally at 85 and of slightly different configuration from the grooves 30 heretofore described in conjunction with FIGURES 1 through 5, such grooves being defined at the juncture of the nut pilot portions 86 and the nut shoulders 87.

The re-entrant mouth of each of the grooves 85 is defined by the nut pilot portion side surfaces 88 and the side surface 89 of the nut shoulder portion 87. The lower enlarged portion of each of the grooves 85 is provided by spaced inset substantially parallel side walls 90 and by a groove bottom wall 91. It will be noted from FIGURES 9 and 10 that the die button projection surface 76 is planar and substantially horizontal and is of a width substantially the same as the width of the mouth of the groove 85, i.e. the distance between the side wall surfaces 88 and 89.

From a comparison of FIGURES 8 and 9, the configuration of the curved, concave surfaces 80 can be observed, this surface blending smoothly into the inner shearing corner 77 at the lower extremity of the embossment 75.

During the assembly of the nut and the panel, the nut is moved relative to the die button 72 with the panel 70 interposed therebetween, the relative movement being effected in any of the ways heretofore set forth.

Upon such release movement, the nut pilot portion 86 cooperates with the shearing edge 77 and the inclined shearing edges 78 to punch the nut through the panel 70. Upon continued movement of the nut relative to the die button, the outer shearing edge 79 of the surface 75 cooperates with the shoulder surface 89 to completely sever a strip from the panel, which strip is then depressed downwardly through the open mouth of the re-entrant groove 85, the surface 76 of the projection 75 contacting the severed panel portion 92 to displace the portion laterally outwardly between the groove side walls 90. The arcuate joining surfaces 80 at the outer extremities of the projection 75 reduce the thickness of the projection 75 so that it does not fit snugly within the mouth of the re-entrant groove 85 at the outer extremities thereof, so that the severed portion 92 is joined to the remainder of the panel 70, as by joining portions 93. These joining portions 93 project laterally to either side of the projection surface 76 and extend through the restricted mouth of the groove 85, so as to join the bottomed and clinched severed portion 92 to the remainder of the panel 70. In this manner, a portion 92 of the panel of less extent than the groove 85 is joined to the remainder of the panel through the arcuate joining portions 93 projecting through the groove mouth.

Of course, the non-flanged and non-grooved sides of the nut may, if desired, be contacted by the die button surfaces 81 to shear or otherwise slightly deform the nut at the time that the nut is punched through the panel, as heretofore described in connection with FIGURE 2 of the drawings.

Figure 11:
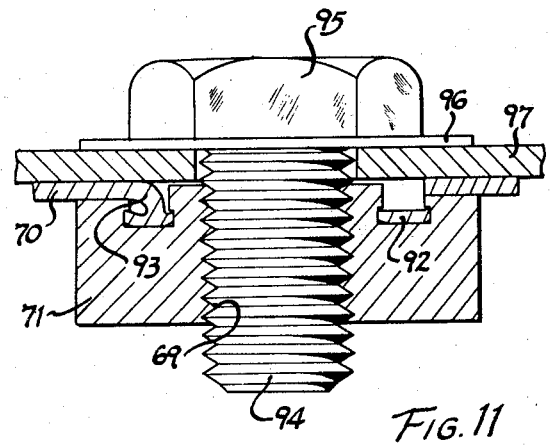
FIGURE 11 is a final bolted assembly utilizing that form of the invention illustrated in FIGURE 6.

In the final assembly illustrated in FIGURE 11 of the drawings, it will be seen that the nut aperture 69 threadedly receives therein the threaded shank 94 of the nut having a head 95 contacting a washer 96, the washer contacting a second panel 97 overlying the panel 70. In the assembly, it will be noted that the undersurface of the panel 97 contacts the exposed upper surface of the panel 70 and does not contact the nut. Further, any embossures or deformation of the nut lies wholly within the confines of the nut and, by being so confined, a smooth exterior surface is presented by the assembly, and there is no opportunity for the deformed portion of the panel to escape from the assembly.

That form of the invention illustrated in FIGURES 6–11, inclusive, has the same advantages as that form of the invention illustrated in FIGURES 1 through 5 and hereinbefore explained. Additionally, the modified form of nut has a further advantage in that the panel is deformed wholly within the confines of the nut and the panel is coplanar with the remainder of the panels at the upper corners of the nut. Thus, any embossure or deformation of the panel is wholly confined within the outline of the nut, and there is no severed portion of the panel at the corners of the nut so that increased torque resistance is obtained.

Having thus described our invention, we claim:
1. A nut-panel assembly comprising a nut having:
 (1) a central polygonal pilot portion projecting through a panel aperture,
 (2) spaced shoulders defining surfaces adjacent opposed sides of said pilot portion against which are bottomed portions of the panel spaced from the panel aperture,
 (3) means defining at least two spaced parallel re-entrant grooves, respectively between each said opposed sides and the adjacent shoulders, said grooves each having a restricted opening adjacent said surface and an enlarged portion below said surface; and the portions of the panel between the edges of the aperture adjacent said opposed sides of said pilot and said bottomed portions each having:
  (a) spaced first portions severed from said panel along lines spaced from and parallel to the respective edge of the aperture, each of said spaced severed portions displaced below the adjacent surface and deformed to a width greater than the width of the groove opening, and
  (b) a second portion integral with adjacent ends of said first portions and the adjacent bottomed portion and extending through the groove opening to join said first portions to the bottomed portion of the panel.
2. A nut-panel assembly comprising a nut having:
 (1) a central polygonal pilot portion projecting through the panel aperture,
 (2) a pair of spaced shoulders defining surface adjacent opposed sides of said pilot portion against which are bottomed first portions of the panel spaced from the panel aperture, and
 (3) means respectively defining elongated generally straight and parallel grooves between each of said surfaces and the adjacent opposed sides, the grooves each having an enlarged portion below the surface and a restricted opening adjacent the surface; and the portions of the panel intermediate the panel aperture edges and said first portions each having:
  (a) a second portion of less length than the grove, completely severed from the panel and deformed in the groove below the surface to a width greater than the width of the opening to be entrapped therein, and
  (b) a third portion integrally joining the opposite ends of the second portion to the first portion and the remainder of the panel.
3. A nut-panel assembly comprising a nut having:
 (1) a central pilot portion projecting through a panel aperture,
 (2) a laterally directed shoulder having a surface against which is bottomed a first portion of the panel spaced from the panel aperture edge adjacent said surface
 (3) means defining an elongated generally straight re-entrant groove between the pilot portion and the shoulder, the groove having an enlarged medial portion below said surface and a restricted opening between said surface and pilot portion; and the portion of the panel between said aperture edge and said first portion having:
  (a) a second portion of less length than the groove completely severed from the first portion along a line spaced from said aperture edge and displaced in said groove below said surface to substantially fill the medial portion thereof, and
  (b) third portions respectively integral with said first portion and opposite ends of said second portion and extending through said restricted opening to join said second portion with said first portion.

4. A nut-panel assembly comprising a nut having:
(1) a central pilot portion having at least one side which is substantially planar,
(2) a laterally directed shoulder defining a surface spaced from said at least one planar side,
(3) means defining an elongated generally straight groove coextensive with said planar side and said surface and interposed therebetween, said groove having a restricted opening between said surface and said planar side and an enlarged portion below said surface; and said panel having:
   (a) a first portion spaced from an aperture edge adjacent said planar side and bottomed on said surface,
   (b) a second portion between said first portion and said aperture edge severed from the panel along a line spaced from said aperture edge, said second portion being bottomed in said groove and deformed to a width greater than said restricted opening, and
   (c) a third portion integral with said first and second portions and extending through said groove to join said first portion with said second portion.

References Cited

UNITED STATES PATENTS

| | | | |
|---|---|---|---|
| 3,299,500 | 1/1967 | Double | 151—41.72 |
| 2,310,316 | 2/1943 | Renner | 151—41.72 |
| 3,213,914 | 10/1965 | Baumle et al. | 151—41.72 |

EDWARD ALLEN, *Primary Examiner.*